US005120618A

United States Patent [19]

Mori et al.

[11] Patent Number: 5,120,618

[45] Date of Patent: Jun. 9, 1992

[54] ELECTROLUMINESCENT PANEL

[75] Inventors: Kiju Mori, Machida; Nobuhisa Kanemitsu, Ebina; Junichi Watanabe, Yokohama; Mitsuru Kagawa, Tokyo; Kazuhiro Hasegawa, Yokohama; Shigehiro Mochizuki, Yokohama; Fumio Kondo, Yokohama, all of Japan

[73] Assignee: Stanley Electric Co., Ltd., Tokyo, Japan

[21] Appl. No.: 563,252

[22] Filed: Aug. 6, 1990

Related U.S. Application Data

[62] Division of Ser. No. 400,571, Aug. 30, 1989, Pat. No. 5,055,076.

[30] Foreign Application Priority Data

Mar. 9, 1989 [JP] Japan .................................. 1-57070
Aug. 3, 1989 [JP] Japan .................................. 1-201608

[51] Int. Cl.[5] .......................... B32B 15/02; H01J 1/62

[52] U.S. Cl. .................................. 428/690; 428/917; 313/506; 313/507; 313/512

[58] Field of Search ....................... 313/506, 509, 512; 428/690, 917, 457

[56] References Cited

U.S. PATENT DOCUMENTS

| | | | |
|---|---|---|---|
| 3,197,664 | 7/1965 | Sentementes | 313/108 |
| 3,238,407 | 3/1966 | Jaffe | 313/108 |
| 3,341,916 | 9/1967 | Greene | 156/67 |
| 3,376,177 | 4/1968 | Bowser et al. | 156/67 |
| 3,517,438 | 6/1970 | Johnson et al. | 228/180.2 |
| 3,535,780 | 10/1970 | Berger | 156/324 |
| 4,647,337 | 3/1987 | Simopoulos et al. | 313/506 |
| 4,956,031 | 9/1990 | Mori et al. | 428/917 |

*Primary Examiner*—Ellis P. Robinson
*Assistant Examiner*—Charles R. Nold
*Attorney, Agent, or Firm*—Frishauf, Holtz, Goodman & Woodward

[57] ABSTRACT

An electroluminescent panel and a method of manufacturing the same which comprises: forming a roll of luminous base film which includes a luminous layer made of phosphors embedded in an insulating material, the luminous layer being laminated upon a conductive film; forming a roll of a transparent conductive film; passing the luminous base film and the transparent conductive film between a pair of rollers while sandwiching a power supply bus bar made of a metal film therebetween, to thereby form the luminous film, the transparent conductive film and the power supply bus bar into an integrated body by means of pressurized heating; cutting the integrated body into at least one piece having a predetermined length; and mounting a terminal to the at least one piece packaging the at least one piece with a moisture proof film.

5 Claims, 4 Drawing Sheets

PRIOR ART

ELECTROLUMINESCENT PANEL

BACKGROUND OF THE INVENTION

1. Field of the Invention

The present invention relates to an electroluminescent panel and a method of manufacturing the same.

2. Description of the Prior Art

As shown in FIGS. 14 and 15, a conventional electroluminescent panel 20 is manufactured in such a way that a luminous layer 22 composed of phosphors embedded in an insulating substance is laminated upon a back electrode (e.g., aluminum foil) to thereby form a luminous base 23. This base 23 is then laminated upon a transparent conductive layer 25 on which a bus bar 24 of a predetermined pattern is printed with conductive paint. The luminous base 23 and the transparent conductive layer 25 are then packaged within a moisture proof film 26 to obtain a finished electroluminescent panel 20.

A conventional bus bar 24 is made of conductive paint so that it has an electrical conductivity as small as one hundredth to one thousandth of that of metal material It is therefore necessary for a large scale electroluminescent panel to use a wide or thick conductive paint bus bar 24, posing problems of reduction of an effective screen area, increase of production processes, and the like.

Further, a conventional bus bar 24 is usually formed by means of screen printing so that the size of the electroluminescent panel 20 is constrained by the dimension of the printing machine. Furthermore, if electroluminescent panels of various sizes are required to be manufactured, a corresponding number of luminous bases 23 are required to be prepared at different production lines, thus posing complicated production management and poor production efficiency.

SUMMARY OF THE INVENTION

It is therefore an object of the present invention to provide an electroluminescent panel capable of eliminating the above-described prior art problems, while ensuring high electrical conductivity of the bus bar without necessiating complicated production management and deteriorating production efficiency.

The above object is achieved by the method of manufacturing an electroluminescent panel according to the present invention, which comprises the steps of:

forming a roll of a luminous base film made of phosphors embedded in insulating material, said luminous base film being laminated upon a conductive film;

forming a roll of a transparent conductive film;

passing said luminous base film and said transparent conductive film between a pair of rollers while sandwiching a power supply bus bar made of a metal film therebetween, to thereby form said luminous film, transparent conductive film and power supply bus bar into an integrated body by means of pressurized heating;

cutting said integrated body into at least one piece having a predetermined length; and mounting a terminal and packaging said at least one piece within a moisture proof film.

According to the present invention, since a power supply bus bar made of a metal film is used, the bus bar has a high electrical conductivity, thereby realizing a large scale electroluminescent panel having a high power supply efficiency. In addition, the luminous base film and transparent conductive film are formed in a roll so that continuous production processes are possible, thus realizing a large scale electroluminescent panel with improved productivity.

DETAILED DESCRIPTION

Figure 1:
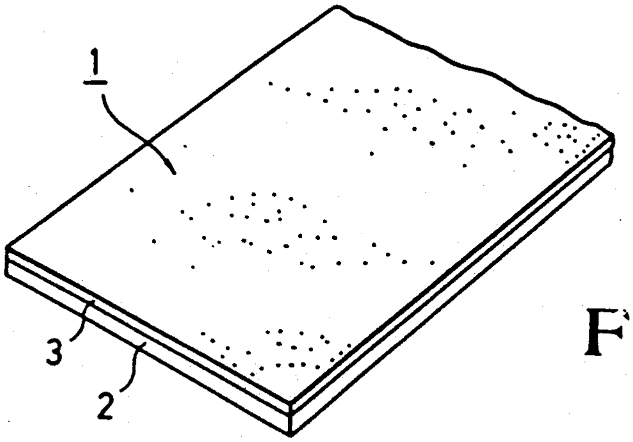
FIG. 1 is a perspective view of a luminous base film made according to an embodiment of the method of manufacturing an electroluminescent panel of this invention.

FIG. 1 is a perspective view of a luminous base film 1 according to the first embodiment of this invention. Luminous base film 1 comprises a luminous layer 3 laminated upon a metal film 2. The metal film 2 such as an aluminum film of elongated size is used as a back electrode of the electroluminescent panel. The luminous layer 3 is made of phosphors embedded in insulating material.

Figure 2:
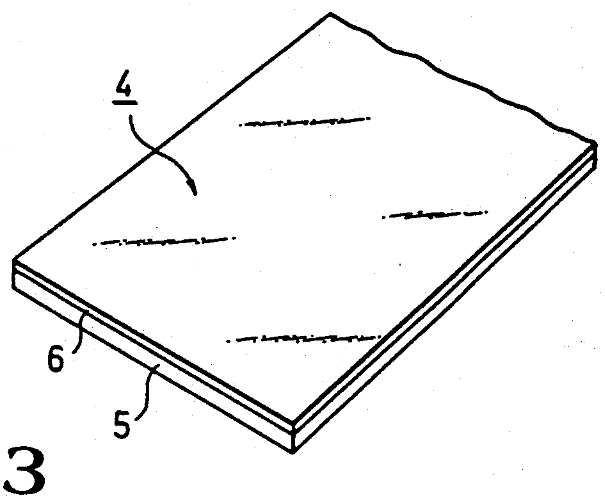
FIG. 2 is a perspective view of a transparent conductive film according to the same embodiment.

FIG. 2 is a perspective view of a transparent conductive film 4 according to the first embodiment. The transparent conductive film 4 comprises a transparent and conductive ITO film 6 laminated upon a transparent film 5 such as a PET film.

Figure 3:
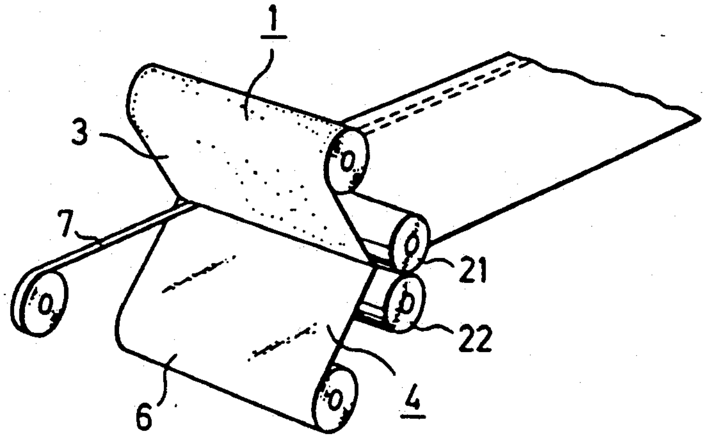
FIG. 3 is a perspective view showing a manufacturing step of a luminous body according to the same embodiment.

The luminous base film 1 and the transparent conductive film 4 are each formed in a roll. The rolls of the films 1 and 4 are mounted as shown in FIG. 3 so as to make the luminous layer 3 of the luminous base film 1 face the ITO film 6 of the transparent conductive film 4. The films 1 and 4 are passed through a pair of rollers 21 and 22 while sandwiching a bus bar 7 therebetween, to form the films 1 and 4 into an integrated body by means of pressurized heating. The bus bar 7 is sandwiched between the films 1 and 4 at one side portion of the films. The bus bar 7 is made of a metal foil such as copper, phosphor bronze, or aluminum.

Figure 4:
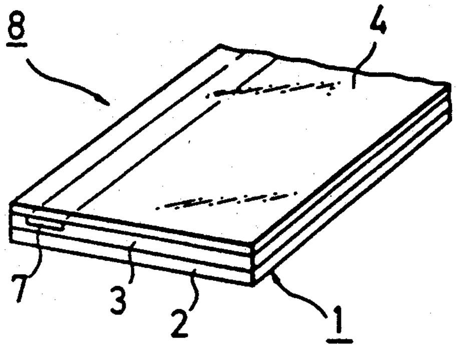
FIG. 4 is a perspective view of the luminous body according to the same embodiment.

The integrated luminous body 8 thus formed is shown in FIG. 4. As shown, the bus bar 7 is integrally sandwiched between the luminous base film 1 and transparent conductive film 4.

Figure 5:
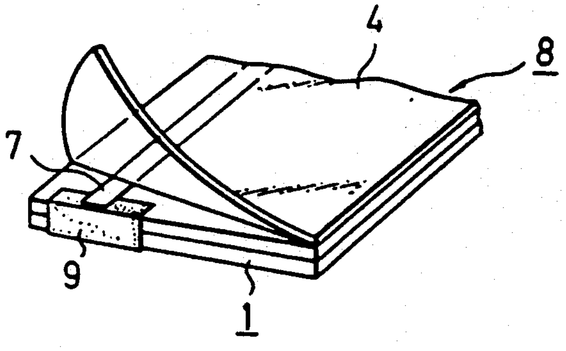
FIGS. 5 and 6 are a perspective view and a cross sectional view, respectively, showing the mounting process of a power supply metal foil according to the same embodiment.
Figure 6:
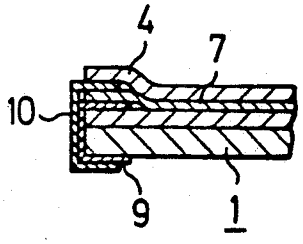

The integrated luminous body 8 is then cut into pieces having desired lengths. As shown in FIGS. 5 and 6, an insulating both-side adhesive tape 9 (FIG. 5) is attached at the end portion of the bus bar 7. A power supply metal foil 10 (FIG. 6) is attached onto the tape 9, the foil 10 being made of copper, aluminum or phosphor bronze. The tape 9 is positioned under the bus bar 7, whereas the metal foil 10 is positioned over the bus bar 7.

Figure 7:
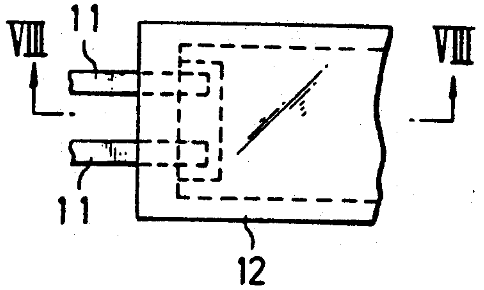
FIG. 7 is a rear view showing the packaging process according to the same embodiment.
Figure 8:
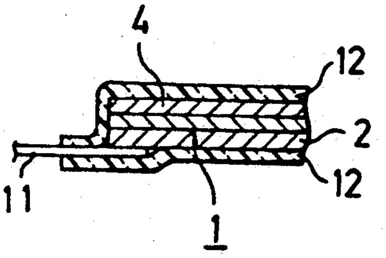
FIG. 8 is a cross section taken along line VIII—VIII of FIG. 7.

Thereafter, as shown in FIGS. 7 and 8, lead terminals 11 are connected to the metal film 2 of the luminous base film 1 and to the power supply metal foil 10. This arrangement with respect to the lead terminals 11 is the same as a conventional electroluminescent panel, so a detailed description thereof is omitted.

The luminous body 8 with the lead terminals 11 connected thereto is then packaged with a moisture proof film 12 (see FIG. 8) within complete an electroluminescent panel of the first embodiment.

The electroluminescent panel manufactured as above has the bus bar 7 made of a metal film embedded within the panel. Even if a narrow and thin bus bar is used, a electrical conductivity is ensured without significant voltage drop, thereby realizing a large effective luminous screen area even for a large scale panel.

Further, the luminous body 8 may be cut in any desired size, small or large, according to the size of an electroluminescent panel.

Figure 9:
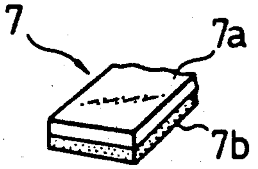
FIG. 9 is a perspective view showing the main part of a bus bar according to a second embodiment of this invention.

FIG. 9 is a perspective view of a bus bar according to the second embodiment of this invention. In this embodiment, the bus bar 7 comprises a metal foil 7*a* such as copper, phosphor bronze, or aluminum and an insulating adhesive layer 7*b*. This bus bar 7 is sandwiched between the luminous base film 1 and transparent conductive film 4 in the same manner as described with reference to FIG. 3, so as be formed into an integrated luminous body 8. The insulating adhesive layer 76 is mounted facing the luminous layer 3 of the luminous base film 1.

When the luminous body 8 is cut during a later process into pieces having desired lengths, the metal foil 7*a* may be bent or cut unevenly to contact the metal film 2 of the luminous base film 1. The insulating adhesive layer 7*b* prevents such undesired contact and thus ensures a reliable electroluminescent panel.

The other structural features of the second embodiment are the same as the first embodiment, so a detailed description thereof is omitted.

Figure 10:
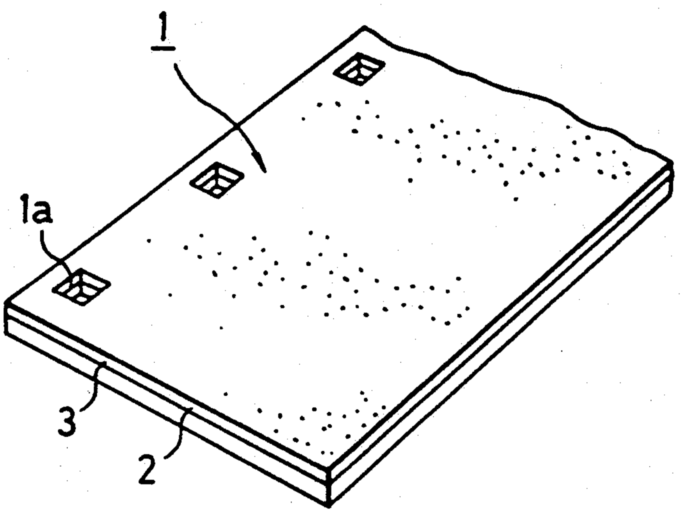
FIG. 10 is a perspective view showing the main part of a luminous base film according to a third embodiment of this invention.

FIG. 10 shows the third embodiment of this invention. The luminous base film 1 of this embodiment also comprises a laminated film of a metal film 2 and luminous layer 3, in the same manner as the first and second embodiments. However, in this embodiment, through-holes 1*a* are formed along one side portion of the luminous base film 1.

Figure 11:
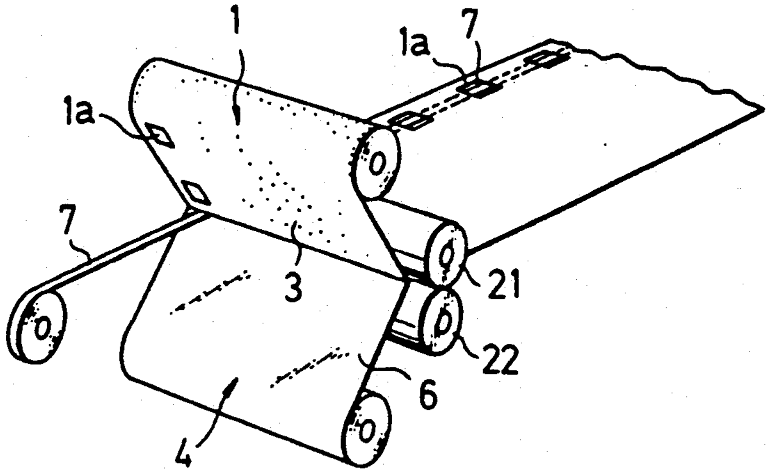
FIG. 11 is a perspective view showing a manufacturing process of a luminous body according to the third embodiment.

The luminous base film 1 and the transparent conductive film 4 (refer to FIG. 2) each in a roll form are mounted as shown in FIG. 11 so as to make the luminous layer 3 of the luminous base film 1 face the ITO film 6 of the transparent conductive film 4. The films 1 and 4 are passed through a pair of rollers 21 and 22 while sandwiching the bus bar 7 to form the films 1 and 4 into an integrated body by means of pressurized heating. The bus bar 7 is sandwiched between the films 1 and 4 at the position where the through-holes 1*a* are formed.

Figure 12:
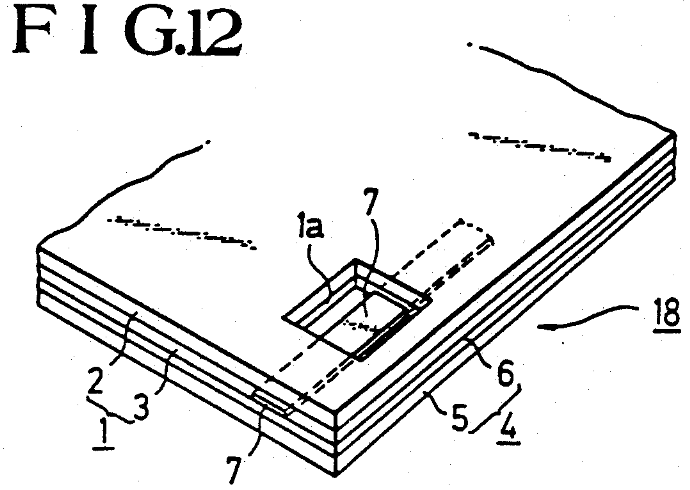
FIG. 12 is a perspective view showing a luminous body according to the third embodiment.

The integrated luminous body 18 thus formed is shown in FIG. 12. As shown, the bus bar 7 is exposed at the through-holes 1*a*.

Figure 13:
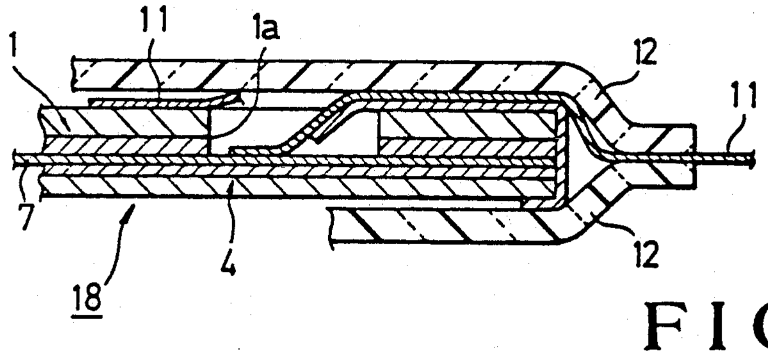
FIG. 13 is a cross section showing the main part of the packaging produced according to the process of the third embodiment.
Figure 14:
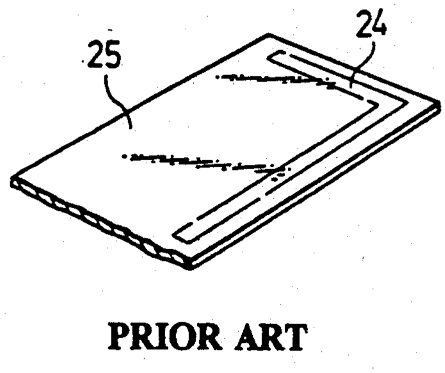
FIGS. 14 and 15 are schematic illustrations used for explaining the conventional method of manufacturing an electroluminescent panel.
Figure 15:
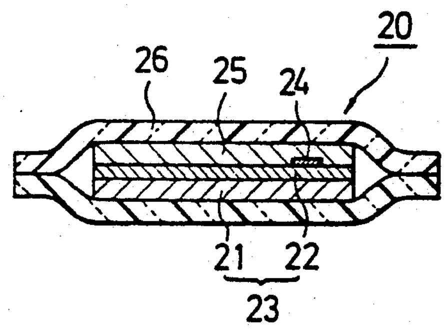
PRIOR ART FIG.15

As described with the first and second embodiments, the integrated luminous body 18 is then cut into pieces having desired lengths. As shown in FIG. 13, the integrated luminous body 18 is packaged with a moisture proof film 12 by a heating process to complete an electroluminescent panel. In the cutting process of the luminous body 18, each piece is cut so as to include at least one through-hole 1*a*.

Since the luminous body 18 cut into a piece has at least one through-hole 1*a*, the bus bar 7 is exposed therefrom. A lead terminal 11 for the transparent conductive film 4 can be directly connected to the exposed portion of the bus bar 7, thus allowing for an easy connection.

As described so far, according to the present invention, both the luminous base film and transparent conductive film are formed into an integrated luminous body while sandwiching the power supply bus bar made of a metal film therebetween. The electric conductivity of the power supply bus bar is therefore improved considerably with less voltage drop, thereby realizing a large scale, especially elongated, electroluminescent panel which has been heretofore impossible to be manufactured. Further, through-holes are formed in the luminous base film at predetermined intervals along one side portion thereof so that the bus bar is exposed through the holes. As a result, connection of a lead wire for the transparent conductive film cut in small pieces can be made easily. In addition, electroluminescent panels of various sizes can be readily manufactured from rolls of the two films, thus improving the production efficiency while ensuring cost effectiveness.

While it is apparent that many modifications and variations may be implemented without departing from the scope of the novel concept of this invention, it is intended by the appended claims to cover all such modifications and variations which fall within the true spirit and scope of the invention.

We claim:

1. An electroluminescent panel made from an elongated, continuous, luminous base film in the form of a roll, and which comprises an electrically luminous layer made of phosphors embedded in an insulating material, and an electrically conductive film laminated on said luminous layer, said luminous base film having a plurality of through-holes therein at least at one side portion thereof, said through-holes being spaced apart along the length of said roll; a transparent, elongated, electrically conductive film which is applied to said luminous base film; and a power supply bus bar sandwiched between said luminous base film and said transparent conductive film at positions facing said through-holes such that said bus bar is exposed to the outside through said through-holes and so as to form a laminated structure of said luminous base film, said power supply bus bar and said transparent electrically conductive film, said electroluminescent panel comprising:

cut-off portions of said laminated structure, each cut-off portion having a predetermined length so as to include at least one of said through-holes therein;

a power supply lead wire for said transparent conductive film directly connected to, and in direct contact with said power supply bus bar through respective ones of said through-holes, said power supply lead wire being in direct contact with said power supply bus bar without any intermediary conducting material therebetween, and said power supply lead wire leading to the outside of said laminated structure; and a moisture proof film enclosing said cut-off portion with said power supply lead wire extending to the outside through said moisture proof film.

2. The electroluminescent panel of claim 1, wherein said power supply bus bar comprises a metal layer and an insulating adhesive layer attached to one side of said metal layer, said insulating adhesive layer facing said transparent electrically conductive film, and said metal layer being exposed directly to the power supply lead wire through said at least one through-hole of said luminous base film.

3. The electroluminescent panel of claim 1, wherein said transparent electrically conductive film comprises a metallic film.

4. The electroluminescent panel of claim 1, wherein said transparent electrically conductive film comprises a transparent electrically conductive layer laminated upon a transparent insulating layer.

5. The electroluminescent panel of claim 1, wherein said power supply bus bar comprises a metal foil member.

* * * * *

UNITED STATES PATENT AND TRADEMARK OFFICE

CERTIFICATE OF CORRECTION

PATENT NO. : 5,120,618

DATED : June 9, 1992

INVENTOR(S) : MORI et al

It is certified that error appears in the above-identified patent and that said Letters Patent is hereby corrected as shown below:

Column 3, line 27:

Before "electrical", insert --sufficient--.

Signed and Sealed this

Fourth Day of January, 1994

Attest:

BRUCE LEHMAN

Attesting Officer

Commissioner of Patents and Trademarks